US008976757B2

(12) United States Patent
Bennett et al.

(10) Patent No.: US 8,976,757 B2
(45) Date of Patent: Mar. 10, 2015

(54) CALL CONTINUITY

(75) Inventors: Andrew Jonathan Bennett, Swindon (GB); Alessio Casati, Swindon (GB); Sudeep Kumar Palat, Swindon (GB); Said Tatesh, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 1202 days.

(21) Appl. No.: 12/309,969

(22) PCT Filed: Mar. 20, 2007

(86) PCT No.: PCT/EP2007/002540
§ 371 (c)(1),
(2), (4) Date: Jul. 24, 2009

(87) PCT Pub. No.: WO2008/017328
PCT Pub. Date: Feb. 14, 2008

(65) Prior Publication Data
US 2009/0296654 A1    Dec. 3, 2009

(30) Foreign Application Priority Data
Aug. 8, 2006 (GB) .................................. 0615695.4

(51) Int. Cl.
H04W 36/04    (2009.01)
H04W 36/00    (2009.01)
(52) U.S. Cl.
CPC ................................ *H04W 36/0022* (2013.01)
USPC .......................................... 370/331; 455/443
(58) Field of Classification Search
USPC ............ 370/310.2, 328–339, 349; 455/422.1, 455/432.1, 436–444
See application file for complete search history.

(56) References Cited

U.S. PATENT DOCUMENTS 7,359,347 B2 *   4/2008   Ahmavaara et al. .......... 370/328
2003/0114158 A1   6/2003   Soderbacka et al.
(Continued)

FOREIGN PATENT DOCUMENTS

EP    1 331 832    7/2003
WO    WO 00/60895    10/2000
(Continued)

OTHER PUBLICATIONS

Holma et al., WCDMA for UMTS—Radio Access for Third Generation Mobile Communications, Third Edition, Jan. 28, 2005, Wiley & Sons, Ltd., 3rd Ed.*
(Continued)

*Primary Examiner* — Hoon J Chung
(74) *Attorney, Agent, or Firm* — Harness, Dickey & Pierce

(57) ABSTRACT

A method is provided of transferring a call connection with a mobile terminal from a first network to a second network. The first network is capable of handling both circuit-switched and packet-switched modes of connection. The second network is capable of handling one of the packet-switched or circuit-switched modes of connection but not both. The terminal is capable of both packet-switched and circuit-switched call modes of connection. The method comprises the first network: identifying the location of the mobile terminal with respect to at least one of the networks, identifying the mobile terminal as being in a mode of connection not usable in the second network, instructing the mobile terminal to transfer the call connection to the other mode of connection, and transferring the call connection to the second network.

15 Claims, 4 Drawing Sheets

(56) References Cited

U.S. PATENT DOCUMENTS

| | | |
|---|---|---|
| 2003/0139184 A1 | 7/2003 | Singh et al. |
| 2003/0157935 A1* | 8/2003 | Kauhanen ............... 455/436 |
| 2004/0017777 A1* | 1/2004 | Chaudhuri et al. ......... 370/241 |
| 2004/0228305 A1* | 11/2004 | Grieco ................... 370/335 |
| 2004/0246990 A1 | 12/2004 | Krishnamurthi et al. |
| 2006/0040691 A1* | 2/2006 | Diep et al. ............... 455/518 |
| 2007/0218903 A1* | 9/2007 | Grech .................... 455/436 |
| 2007/0248079 A1* | 10/2007 | Jayaram et al. ........... 370/352 |
| 2008/0026752 A1* | 1/2008 | Flore et al. .............. 455/435.2 |
| 2010/0061337 A1* | 3/2010 | Hallenstal et al. ......... 370/331 |

FOREIGN PATENT DOCUMENTS

| | | |
|---|---|---|
| WO | WO 2005/027557 | 3/2005 |
| WO | WO 2006/057924 | 6/2006 |

OTHER PUBLICATIONS $3^{rd}$ Generation Partnership Project; Technical Specification Group Services and System Aspects; Voice Call Continuity between CS and IMS; Stage 2 (Release 7); 2006.

Office Action for corresponding Chinese Application No. 200780037113.7 dated May 25, 2011 and English translation thereof.

* cited by examiner

CALL CONTINUITY

FIELD OF THE INVENTION

The present invention relates to telecommunications, in particular to wireless telecommunications.

DESCRIPTION OF THE RELATED ART

Within a larger Universal Mobile Telecommunications System, UMTS, network, there are networks, often called sub-networks or domains, which provide packet-switched, PS, voice services. These services are often denoted Voice over UMTS-PS services.

Deployment of UMTS-PS voice domains will not be global, at least initially. Accordingly, there will be areas where UMTS coverage is provided only by circuit-switched domains, often denoted UMTS-CS domains, of a UMTS network. Only voice services that are circuit-switched are supported in those areas.

It is known to transfer a call between a circuit-switched domain and a packet-switched domain in a UMTS network that has both domains. For a voice call, a known way to perform this transfer is called Voice Call Continuity, VCC. VCC requires simultaneous connection by a mobile terminal to the both the UMTS-CS and UMTS-PS domains during transfer. Simultaneous UMTS-CS and UMTS-PS connection to a mobile terminal having just one radio transmitter-receiver is possible because the same radio access network, RAN, specifically the UMTS terrestrial radio access network, UTRAN, is then used.

The VCC process is triggered by the mobile terminal sending a set-up message. For a transfer from UMTS-CS domain to a UMTS-PS domain, a Session Initialization Protocol, SIP, message is sent to the UMTS-PS domain. For transfer from UMTS-PS domain to a UMTS-CS domain, a specific Call SetUp message is sent to the UMTS_CS domain.

Further information regarding VCC can be found in Third Generation Partnership Project, 3GPP, Technical Specification 23.206 (Release 7), "Voice call continuity between circuit-switched (CS) and IP Multimedia Subsystem (IMS)", Stage 2, see, for example, the following internet address: http://www.3gpp.org/ftp/Specs/archive/23_series/23.206/23206-121.zip As part of the well-known third Generation Partnership Project, 3GPP, so-called Long Term Evolution, LTE, networks have been developed based to some extent on the UMTS terrestrial radio access network, UTRAN. LTE networks only support voice services that are packet-switched voice services.

When a mobile terminal moves between an LTE network and a UMTS or Global System for Mobiles, GSM, network, simultaneous connection to both the packet-switched LTE network and either the circuit-switched domain of the UMTS network or the circuit-switched GSM network would require a mobile terminal includes two radio transmitter-receivers. Such mobile terminals would be expensive. Accordingly, such terminals are unlikely to be widely available. This means for most mobile terminals direct transfer is not possible between, say, a circuit-switched call on a GSM or UMTS network, and a Voice over Internet Protocol, VoIP, session on an LTE network.

SUMMARY OF THE INVENTION

The inventors realized that there is a need to enable calls that have been established over one type of network to be transferred to another type of network, and vice versa; but that many mobile terminals would not be able to support simultaneous radio connections over both networks.

The present invention provides a method of transferring a call connection with a mobile terminal from a first network to a second network. The first network is capable of handling both circuit-switched and packet-switched modes of connection. The second network is capable of handling one of the packet-switched or circuit-switched modes of connection but not both. The terminal is capable of both packet-switched and circuit-switched call modes of connection. The method comprises the first network: identifying the location of the mobile terminal with respect to at least one of the networks, identifying the mobile terminal as being in a mode of connection not usable in the second network, instructing the mobile terminal to transfer the call connection to the other mode of connection, and transferring the call connection to the second network.

For example, in one embodiment, by using, in sequence, first circuit-switched call handover, then the VCC procedure, and then packet-switched call handover procedures, it becomes possible to transfer a circuit-switched voice call (in GSM or UMTS environment) to a VoIP session in an LTE network, with little or no disruption perceivable by the end user. A transfer in the opposite direction is also enabled.

In an example embodiment, a mechanism is provided for a voice call with a so-called trimode (GSM/UMTS/LTE capable) mobile terminal to be transferred from a UMTS-CS or GSM network to an LTE network.

BRIEF DESCRIPTION OF THE DRAWINGS

Embodiments of the present invention will now be described by way of example and with reference to the drawings, in which.

The drawings are not to scale but are schematic representations.

DETAILED DESCRIPTION

The structure of a first system is described that is made up of several networks. Radio coverage of those networks is considered, followed by procedures for transferring a call between networks. An example sequence of using the procedures is then described.

A second system is then described and its functioning explained.

First System Structure

Figure 1:
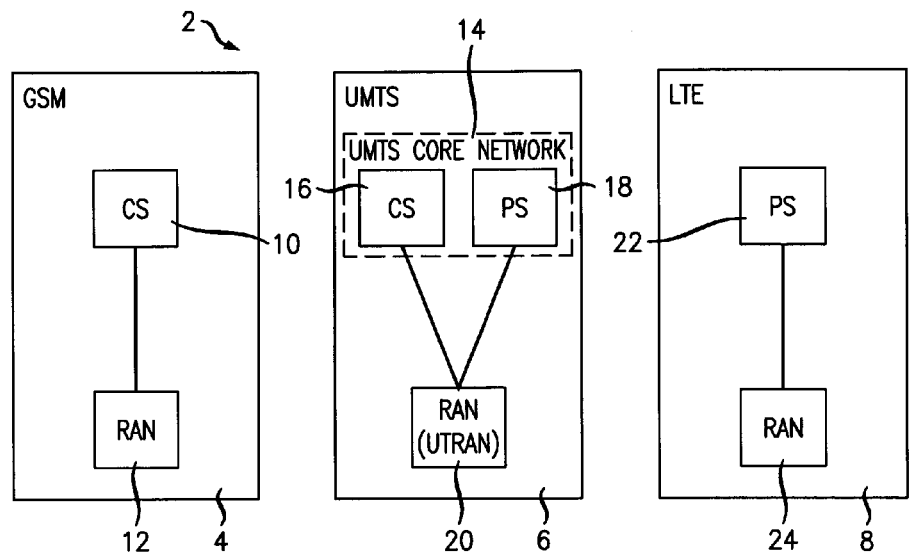
FIG. 1 is a diagram illustrating three networks for wireless telecommunications.

FIG. 1 shows a system 2 consisting of three networks of different types: a GSM network 4, a UMTS network 6, and an LTE network 8.

The GSM network 4 is a circuit-switched, CS, network that includes a core network 10 including a Mobile Switching Centre, MSC. The GSM core network 10 supports voice calls. The core network 10 is connected to a GSM radio access network, RAN, 12.

The UMTS network 6 includes a core network 14 constituted by a circuit-switched domain 16 and a packet-switched domain 18. Both domains 16,18 support voice services. The circuit-switched domain 16 includes a Mobile Switching Centre, MSC (not shown). The packet-switched domain 18 includes a Serving GPRS Support Node, SGSN (not shown), and a Gateway GPRS Support Node, GGSN, (not shown). The two domains 16, 18 are connected to a radio access network, RAN 20, specifically a UMTS Terrestrial Radio Access Network, UTRAN.

In the UMTS packet-switched domain 18, the voice services are Voice over Internet Protocol, VoIP, services. VoIP services are, of course, supported by Internet Protocol Multimedia Subsystem (IMS) domain, as is known.

The LTE network only supports packet-switched services and voice is only supported in the form of VoIP. The LTE network 22 includes a packet-switched core network 22 connected to a radio access network, RAN 24.

As mentioned above, each of the GSM network 4, UMTS network 6 and LTE network 8 includes its own respective radio access network, RAN, 12,20,24. In each case, the RAN consists of radio network controllers (not shown) controlling base stations (not shown). Each base station includes one or more antennas (not shown). The radio coverage area of each antenna is known as a cell (not shown).

Network Coverage

Figure 2:
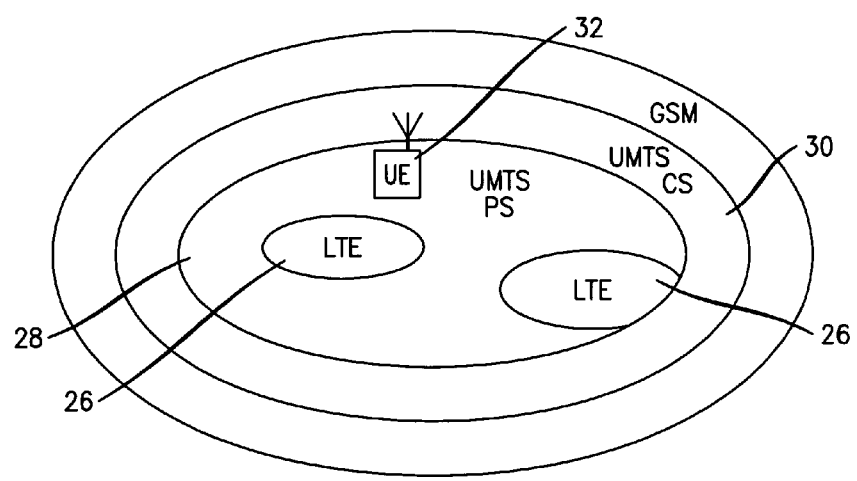
FIG. 2 is a diagram illustrating radio coverage areas of those three networks shown in FIG. 1.

As shown in FIG. 2, the LTE network is deployed so as to provide radio coverage areas 26 where high user density is expected. The UMTS coverage areas 28,30 are larger. Only some areas 28 subject to radio coverage by the UMTS network can handle packet-switched PS voice services. However, the radio coverage area 30 that supports circuit-switched voice services of the UMTS network is larger than the corresponding area in which packet-switched voice services are supported.

The GSM radio coverage area 32 is even larger, such that in a UMTS coverage area 28,30, GSM coverage is also available.

Mobile Terminal

A mobile terminal (User Equipment, UE) 32 used in the system 2 is capable of connection at different times with all three networks 4,6,8, and so is called a tri-mode mobile terminal. The mobile terminal 32 cannot connect to more than one network at a time. The mobile terminal 32 can handle circuit-switched voice services and VoIP services.

Identifying that the Mobile Terminal is Close to a Cell of Another Network

The system 2 can identify when a mobile terminal connected to one of the networks approaches sufficiently closely a cell of another of the networks.

The base station of each cell in a network is configured with a list of neighboring cells. That list includes the information about nearby cells of the other networks in addition to information identifying neighboring cells of the same network as currently connected to. The system 2 also knows, of course, which cell the mobile terminal is currently connected to. Accordingly, by checking the neighboring cell list for the cell the mobile terminal is in, the system 2 can identify if there are any neighboring cells of any of the other two networks for the mobile terminal.

In addition, the network also receives measurement reports from the mobile terminal. Measurement reports give indications of measured signal attenuation (path loss) and hence distance from base station to the mobile terminal. Accordingly, they provide knowledge of mobile terminal location to a finer granularity than cell level. Based on the measurement reports, the network can identify whether the mobile terminal is close to the border of a cell of one of the other networks.

Procedures for Handing Over a Call Between Networks

The following three procedures are each available and can be controlled by the respective networks:

(1) Handover from UMTS-PS domain to the LTE network, and vice versa.

(2) Handover from UMTS-CS domain to GSM network, and vice versa.

(3) Transfer of voice calls between UMTS-PS and UMTS-CS domains, and vice versa.

These are described in turn below.

(1) Handover from UMTS-PS Domain to the LTE Network, and Vice Versa

It is known in itself to perform packet-switched service handovers between a UMTS-PS domain and an LTE network.

VoIP can be supported by UMTS-PS domains, so transfer between the LTE coverage area and the UMTS coverage area is achieved by such known packet-switched service handover between LTE and UMTS networks. In the LTE network, this means that a network controlled handover capability is provided to and from UMTS-PS.

(2) Handover from UMTS-CS Domain to GSM Network, and Vice Versa

It is known in itself perform circuit-switched service handovers between a GSM network and a UMTS-CS network.

(3) Transfer Between UMTS-PS and UMTS-CS Domains, and Vice Versa

As mentioned previously, it is known in itself to perform voice call transfer between UMTS-PS and UMTS-CS domains, and vice versa. The known procedure is called Voice Call Continuity, VCC. As previously mentioned, VCC requires simultaneous connection by a mobile terminal to the both the UMTS-CS and UMTS-PS domains during a transfer of the call between those two networks. The same radio access network, specifically the UTRAN, is used for both at that time.

The VCC process is triggered by the mobile terminal sending a set-up message. For transfer from UMTS-CS domain to UMTS-PS domain, a Session Initialization Protocol, SIP, message, is sent to the UMTS-PS domain. For transfer from UMTS-PS domain to UMTS-CS domain, a specific Call SetUp message is sent to the UMTS-CS domain.

Example Scenarios

Figure 3:
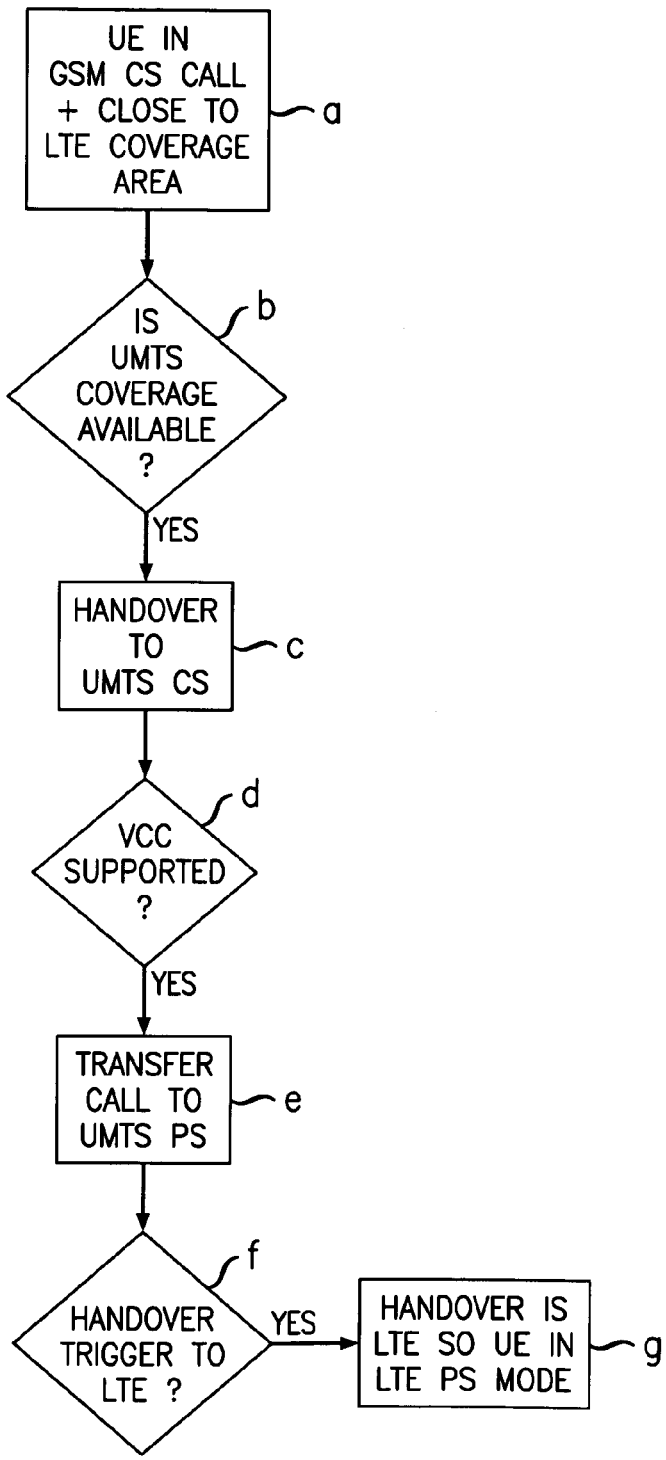
FIG. 3 is a schematic flow-chart illustrating transfer of a call from the GSM network to the LTE network shown in FIG. 1.

A first example scenario is as follows:

As shown in FIG. 3, the trimode (GSM, UMTS, LTE capable) mobile terminal connected to a GSM network and so operating in circuit-switched mode is determined (step a) as being close to the coverage area of the LTE network.

A check is then made as to whether UMTS coverage is also available (step b).

If yes, the call is handed over from the GSM network to the UMTS network circuit-switched domain (step c).

A check is then made as to whether UMTS packet-switched coverage is also available (step d).

If yes, the call is then transferred (step e) to the packet-switched domain. This is done by the UMTS network sending a trigger signal to the mobile terminal now connected to the UMTS-CS domain, instructing the mobile terminal to transfer the call to the UMTS packet-switched domain. This transfer is done using the VCC procedure described above.

After completion of the VCC procedure, resulting in transfer of call to the packet-switched UMTS domain, the mobile terminal receives (step f) a trigger signal from the LTE network indicating that the mobile terminal is within an LTE network coverage area. The mobile is the handed over (step g) to LTE network.

Another example scenario is where a mobile terminal moving from the LTE coverage area will be handed over from the LTE network to the UMTS-PS domain of a UMTS network and then subsequently handed over to the UMTS-CS domain of the UMTS network. Of course, this requires that the UMTS network, the radio coverage of which extends beyond LTE coverage boundaries, must support packet-switched services, in particular packet-switched voice services.

How Transfer between UMTS Packet-switched Domain and UMTS Circuit-switched Domain is Triggered In one embodiment the UMTS network triggers the change over of the service from circuit-switched to packet-switched by sending broadcast information commanding the mobile terminal to perform the VCC procedure if the mobile terminal is within some particular cells (for example, close to the LTE coverage area) If the operator would like to force handover to LTE VoIP, the broadcast information would instruct the mobile terminal to be/get into UMTS-PS mode of connection. Close to a GSM-only area, the mobile terminal would be required to be/get into UMTS-CS mode of connection to effect handover.

Alternatively, in another, otherwise similar, embodiment, trigger signals could be sent over dedicated channels to specific mobile terminals. This can provide good control over which mobile terminals are directed between circuit-switched and packet-switched domains based on, for example, knowledge of the proximity of the mobile terminal to the LTE border, that proximity being known to a finer granularity than merely cell size level.

Some Details

In regions of the network where UMTS-PS domain coverage for voice is patchy and but there is coverage at least by the GSM network, then the UMTS network forces the voice call to be supported using the UMTS-CS domain whilst the call connection is with the UMTS network. For instance, in areas of patchy UMTS-PS domain coverage for voice, UMTS base stations may be configured to transmit information on the broadcast channel that triggers the mobile terminal to move voice calls from a UMTS-PS to UMTS-CS domain. On the other hand, in areas of non-patchy UMTS coverage, the UMTS network can transmit information on the broadcast channel permitting the mobile terminal to keep a voice call connected to the UMTS-PS domain.

When a user starts a call with the GSM network or UMTS-CS domain, the decision to transit to connection with the LTE network is driven by policies as to how to prioritize users, traffic types etc. A call would remain as GSM or UMTS-CS connected, unless the system (or the mobile terminal, based on information on the system available at the mobile terminal) sends a command to shift to VoIP. The mobile terminal could decide to shift to the UMTS-PS domain when the system provides positive information that VoIP is supported by the UMTS network there.

The transition to the LTE network would then be governed by the policies as to user, traffic types etc for Network controlled handover between UMTS-PS domains and LTE networks.

Second Example System

Figure 4:
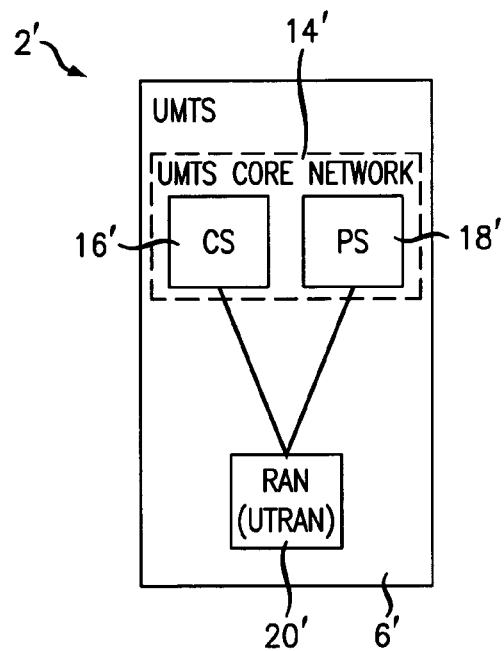
FIG. 4 is a diagram illustrating two networks for wireless telecommunications.

FIG. 4 shows a system 2' consisting of a UMTS network 6'. The UMTS network 6' includes a core network 14' constituted by a circuit-switched domain 16' and a packet-switched domain 18'. Both domains 16', 18' support voice services. The circuit-switched domain 16' includes a Mobile Switching Centre, MSC (not shown). The packet-switched domain 18' includes a Serving GPRS Support Node, SGSN (not shown), and a Gateway GPRS Support Node, GGSN (not shown). The two domains 16',18' are connected to a radio access network, RAN 20', specifically a UMTS Terrestrial Radio Access Network, UTRAN In the UMTS packet-switched domain 14', the voice services are Voice over Internet Protocol, VoIP, services.

The UMTS network 6' includes a radio access network, RAN. The RAN consists of radio network controllers (not shown) controlling base stations (not shown). Each base station includes one or more antennas (not shown). The radio coverage area of each antenna is known as a cell (not shown).

Figure 5:
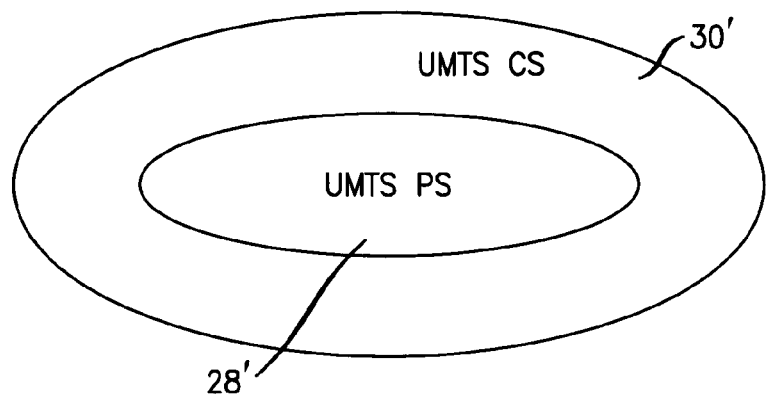
FIG. 5 is a diagram illustrating radio coverage areas of those two networks shown in FIG. 4.

As shown in FIG. 5, only some areas 28' subject to radio coverage by the UMTS network can handle packet-switched voice services. However, the radio coverage area 30' that supports circuit-switched voice services of the UMTS network is larger than the corresponding area in which packet-switched services are supported.

In this example, the mobile terminal is a UMTS only terminal capable of supporting selectably either of CS and PS modes.

Figure 6:
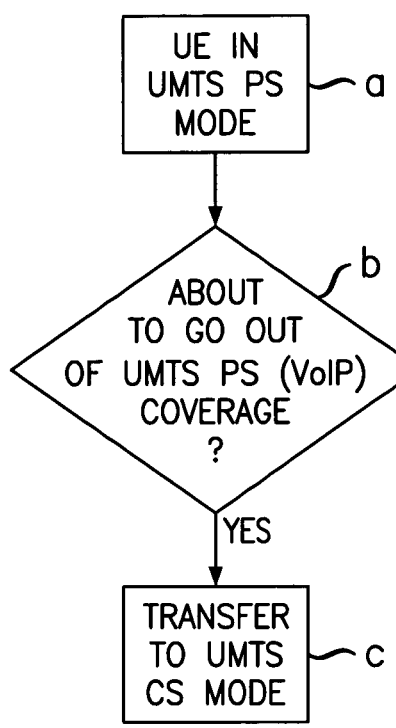
FIG. 6 is a schematic flow-chart illustrating transfer of a call from the GSM network to the packet switched domain of the UMTS network shown in FIG. 4.

An example scenario is shown in FIG. 6. As shown in FIG. 6, the UMTS mobile terminal is connected (step a) to the packet-switched domain 18'. On being determined (step b) as about to go out of an area 28' of packet-switched service coverage, the call is handed over (step c) from connection with the packet-switched domain 18' to connection with the circuit-switched domain 30'. This handover is caused by a trigger signal being sent from the network.

List of Abbreviations

3GPP—Third Generation Partnership Project
CS—circuit-switched
GSM—Global System For Mobiles
LTE—Long Term Evolution
PS—packet-switched
SIP—Session Initialization Protocol,
UMTS—Universal Mobile Telecommunication System
VCC—Voice Call Continuity
VoIP—Voice over Internet Protocol General The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of transferring a call connection with a mobile terminal from a first network to a second network, the first network being configured to handle both circuit-switched and packet-switched modes of connection and the second network being configured to handle one of the packet-switched or circuit-switched modes of connection but not both, the mobile terminal being configured for both packet-switched and circuit-switched call modes of connection, the method comprising:

identifying the location of the mobile terminal with respect to at least one of the networks;

identifying the mobile terminal, which has the call connection to the first network, as being in the one of said packet-switched and circuit-switched modes of connection that is not usable in the second network;

instructing the mobile terminal to transfer the call connection to the other of said packet-switched and circuit-switched modes of connection in the first network;

first transferring the call connection from the one of said packet-switched and circuit-switched modes of connection that is not usable in the second network to the other of said packet-switched and circuit-switched modes of connection in the first network; and second transferring the call connection to the second network after the first transferring.

2. The method according to claim 1, in which the networks have radio coverage areas that are not identical.

3. The method according to claim 1, in which the first network is a UMTS network providing circuit-switched and packet-switched modes of connection.

4. The method according to claim 3, in which the instructing is in accordance with Voice Call Continuity function defined by UMTS standards.

5. The method according to claim 1, in which the second network is a GSM network configured to handle circuit-switched mode of connection but not packet-switched mode of connection.

6. The method according to claim 1, in which the second network is an LTE network configured to handle packet-switched mode of connection but not circuit-switched mode of connection.

7. The method according to claim 1, in which the second network is a UMTS-CS network.

8. The method according to claim 1, in which the second network is a UMTS-PS network.

9. The method according to claim 1, in which the instructing is sent over a broadcast channel.

10. The method according to claim 1, in which the instructing is sent over a channel dedicated to the mobile terminal.

11. The method according to claim 1, in which the mobile terminal is a terminal configured for GSM, UMTS-CS, UMTS-PS and LTE modes of operation.

12. The method according to claim 1, in which the call connection is a voice call connection.

13. The method according to claim 12, in which the call connection in packet-switched mode is a VoIP session.

14. A system for wireless telecommunications comprising a first network and a second network, the first network being configured to handle both circuit-switched and packet-switched modes of call connection to a mobile terminal and the second network being configured to handle one of the packet-switched or circuit-switched modes of call connection but not both, the system being configured to:

identify, by the first network, the location of the mobile terminal with respect to at least one of the networks, identify, by the first network, the mobile terminal, which has a call connection to the first network, as being in the one of said packet-switched and circuit-switched modes of call connection not usable in the second network, instruct, by the first network, the mobile terminal to transfer the call connection to the other of said packet-switched and circuit-switched modes of connection in the first network, first transfer, by the first network, the call connection from the one of said packet-switched and circuit-switched modes of connection that is not usable in the second network to the other of said packet-switched and circuit-switched modes of connection in the first network, and second transfer, by the first network, the call connection from the first network to the second network after the first transfer.

15. A method of preparing to transfer a call connection with a mobile terminal from a first network to a second network, the first network being configured to handle both circuit-switched and packet-switched modes of connection and the second network being configured to handle one of the packet-switched or circuit-switched modes of connection but not both, the mobile terminal being configured for both packet-switched and circuit-switched call modes of connection, the method comprising the first network:

identifying the location of the mobile terminal with respect to at least one of the networks;

identifying the mobile terminal, which has the call connection to the first network, as being in the one of said packet-switched and circuit-switched modes of call connection not usable in the second network;

instructing the mobile terminal to transfer the call connection to the other of said packet-switched and circuit-switched modes of connection in the first network;

first transferring the call connection from the one of said packet-switched and circuit-switched modes of connection that is not usable in the second network to the other of said packet-switched and circuit-switched modes of connection in the first network; and second transferring the call connection from the first network to the second network after the first transferring.

\* \* \* \* \*